(12) United States Patent
Branscomb

(10) Patent No.: US 9,094,375 B2
(45) Date of Patent: Jul. 28, 2015

(54) WAN TRANSPORT OF FRAMES WITH MAC SECURITY

(71) Applicant: Brian Branscomb, Camarillo, CA (US)

(72) Inventor: Brian Branscomb, Camarillo, CA (US)

(73) Assignee: MICROSEMI COMMUNICATIONS, INC., Aliso Viejo, CA (US)

( * ) Notice: Subject to any disclaimer, the term of this patent is extended or adjusted under 35 U.S.C. 154(b) by 0 days.

(21) Appl. No.: 13/671,516

(22) Filed: Nov. 7, 2012

(65) Prior Publication Data

US 2013/0117856 A1    May 9, 2013

Related U.S. Application Data

(60) Provisional application No. 61/556,730, filed on Nov. 7, 2011.

(51) Int. Cl.
H04L 29/06    (2006.01)

(52) U.S. Cl.
CPC .......... *H04L 63/0428* (2013.01); *H04L 63/123* (2013.01); *H04L 63/162* (2013.01)

(58) Field of Classification Search
CPC .............. H04L 63/0428; H04L 63/162; H04L 63/0471
See application file for complete search history.

(56) References Cited

U.S. PATENT DOCUMENTS

| 7,792,100 | B2 | 9/2010 | Hato et al. | |
| 2006/0136715 | A1* | 6/2006 | Han et al. | 713/151 |
| 2011/0149970 | A1* | 6/2011 | Jeong et al. | 370/392 |
| 2013/0091349 | A1* | 4/2013 | Chopra | 713/150 |

FOREIGN PATENT DOCUMENTS

KR    10-2006-0024337    3/2006

OTHER PUBLICATIONS

Altunbasak et al., "Securing Layer 2 in Local Area Networks," Networking-ICN 2005, Lecture Notes in Computer Science vol. 3421, pp. 699-706, 2005.
IEEE Standard for Local and Metropolitan Area Networks: Media Access Control (MAC) Security, IEEE Computer Society, IEEE std. 802.1AE-2006, Aug. 18, 2006.
International Search Report on corresponding PCT Application (PCT/US2012/063996) from International Searching Authority (KIPO) dated Mar. 29, 2013.
Written Opinion on corresponding PCT Application (PCT/US2012/063996) from International Searching Authority (KIPO) dated Mar. 29, 2013.

* cited by examiner

Primary Examiner — Izunna Okeke
(74) Attorney, Agent, or Firm — Simon Kahn

(57) ABSTRACT

A physical layer device provides security processing on communication frames that may include tags or headers that are for use in a wide area network. As frames pass through the physical layer device, the frames are classified for a type of security processing. Depending on the classification a cipher is applied to the frames for integrity checking of data in the frames. Some frames are also encrypted. The security processing may exclude some of the tags or headers. The frames may also be filtered and buffered.

12 Claims, 7 Drawing Sheets

Dual-tagged Ethernet
Classified pre-encryption

| DA | SA | VLAN Tag1 | VLAN Tag2 | Etype | payload | FCS | ← 701 |

Standard MACsec format
Classified pre-decryption

| DA | SA | SecTAG | VLAN Tag1 | VLAN Tag2 | Etype | payload | ICV | FCS | ← 711 |

Protected by ICV

MACsec plus Single Tag Bypass
Classified pre-decryption

| DA | SA | VLAN Tag1 | SecTAG | VLAN Tag2 | Etype | payload | ICV | FCS | ← 721 |

Protected by ICV    Protected by ICV

MACsec plus Dual Tag Bypass
Classified pre-decryption

| DA | SA | VLAN Tag1 | VLAN Tag2 | SecTAG | Etype | payload | ICV | FCS | ← 731 |

Protected by ICV    Protected by ICV

Untagged Ethernet

Standard MACsec format

Single-tagged Ethernet

Standard MACsec format

MACsec plus Single Tag Bypass

Dual-tagged Ethernet

Standard MACsec format

MACsec plus Single Tag Bypass

MACsec plus Dual Tag Bypass

EoMPLS with One Label

Standard MACsec format

MACsec plus EoMPLS Header Bypass

EoMPLS with Two Labels

Standard MACsec format

MACsec plus EoMPLS Header Bypass

WAN TRANSPORT OF FRAMES WITH MAC SECURITY

CROSS REFERENCE TO RELATED APPLICATIONS

This application claims the benefit of U.S. Provisional Application No. 61/556,730, filed on Nov. 7, 2011, the disclosure of which is incorporated herein by reference.

BACKGROUND OF THE INVENTION

The present invention relates generally to security processing in communication networks and, more particularly, to processing media access control security for frames in communication networks that have tags and/or headers for use in a wide area network.

Local area networks may be interconnected through a wide area network. To facilitate transport in the wide area network, information may be added to frames in the local area networks or when frames enter the wide area network. For example, virtual local area network tags may be included in the frames or the frames may be encapsulated inside of multiprotocol label switching packets.

It may be advantageous to secure at least some communication in a network to avoid interception of information or disruption of network operations. Some information may be protected by encrypting the information at its source and decrypting it at its destination. Other information may be protected by inclusion of a check value or digital signature that allows a receiving device to verify that the information has not been altered since it was sent from a transmitting device. One protocol for increasing network security is Media Access Control (MAC) Security of IEEE Std. 802.1AE.

When frames with tags or headers for use in a wide area network are secured, the security measures may interfere with operations in the wide area network. Tags and headers that are encrypted may not be accessible by devices in the wide area network. Tags and headers that are secured by a check value may not be changed, for example, to updated routing information, by devices in the wide area network because changes may invalidate check values and cause a receiving device to reject altered frames.

BRIEF SUMMARY OF THE INVENTION

Some aspects of the present invention provide a transmission device for a communications network, the transmission device comprising: circuitry configured to determine a class of security processing to perform on a frame for transmission based on at least one value included in the frame; circuitry configured to apply security processing to the portion of the frame to generate a secured frame, the applied security processing excluding application of security processing of at least one virtual local area network (VLAN) tag of the frame for at least one class of security processing; and circuitry configured to process the secured frame to generate an output signal for transmission to a communication network.

Another aspect of the invention provides a receive device for a communications network, the receive device comprising: circuitry configured to receive a frame from a communication network; circuitry configured to determine a class of security processing to perform on at least portions of the received frame based on a security tag included in the received frame; and circuitry configured to apply security processing to the received frame, excluding a portion of the received frame including at least one virtual local area network (VLAN) tag, to verify the integrity of the received frame.

Another aspect of the invention provides a method for performing security processing on communications frames including tags for use in a wide area network, the method comprising: determining whether a frame is to receive selective security processing; and performing security processing on portions of the frame other than at least one virtual local area networking (VLAN) tag of the frame.

These and other aspects of the invention are more fully comprehended upon review of this disclosure.

DETAILED DESCRIPTION

Figure 1:
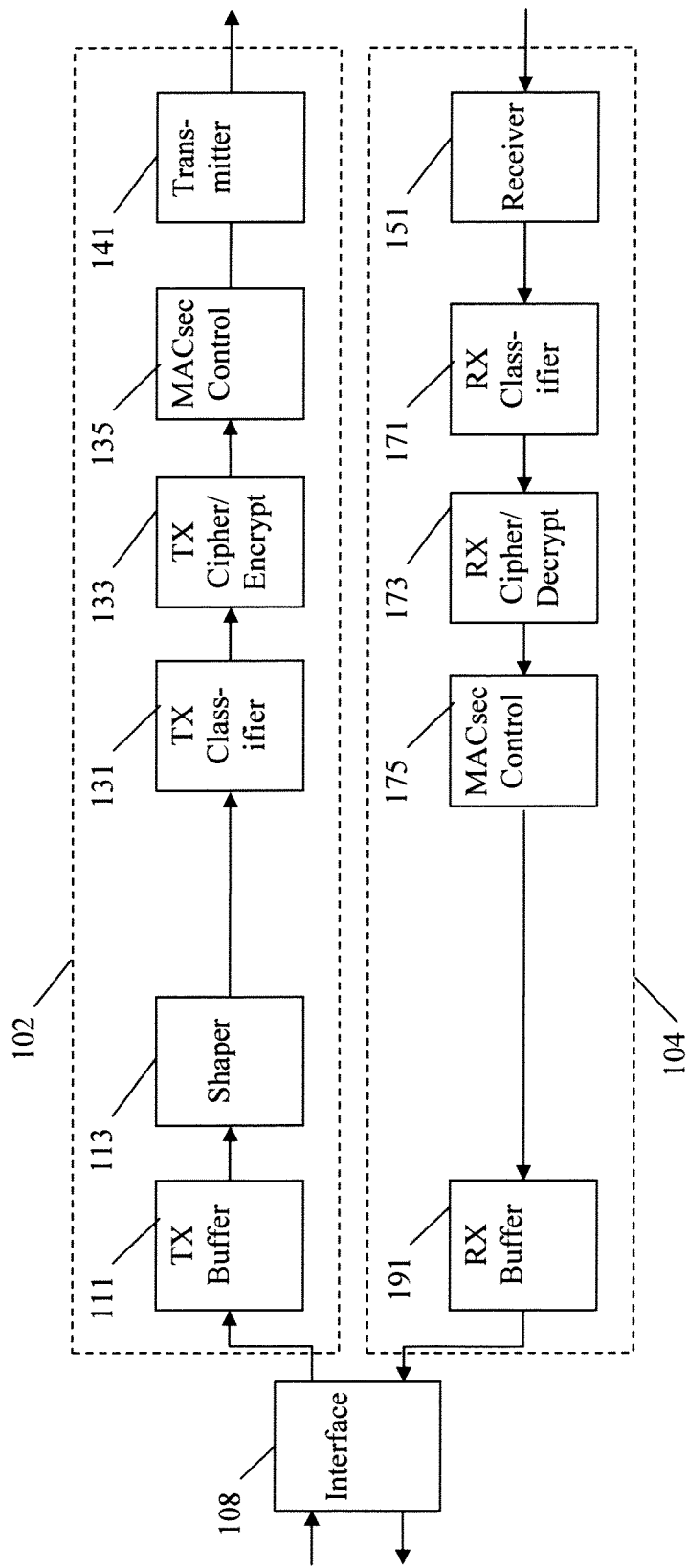
FIG. 1 is a block diagram of physical layer communication device in accordance with aspects of the invention.

FIG. 1 is a block diagram of a physical layer communication device (PHY) in accordance with aspects of the invention. The PHY includes a transmit path 100 to transmit an output signal to a communication network and a receive path 104 to receive an input signal from the communication network. In some embodiments, the communication network is a wide area network (WAN). The transmit path 102 and the receive path 102 both provide MAC security (MACsec) processing. In some embodiments, the transmit path 102 and the receive path 102 also provide other processing, for example, processing of timestamps. The PHY includes an interface block 108 for coupling to a higher-layer device, such as a media access control device. The PHY receives frames from the higher-layer device for transmission to the communication network by way of the interface block 108 and transmits the frames through the transmit path 102. The PHY receives frames from the communication network through the receive path 104 and transmits the received frames to the higher-layer device by way of the interface block 108. The blocks of the PHY are generally implemented with electronic circuitry. For example, in one embodiment the PHY is provided in an integrated circuit. Software programming may be used to control operation of some circuitry in the PHY. A programmable processor may be used to configure the circuitry of the PHY and to handle exception conditions.

The transmit path 102 stores frames received for transmission in a transmit buffer 111. The transmit buffer 111 provides rate matching for rates that may differ between receiving data from the higher-layer device and transmitting data from the PHY. In particular, rates may differ and vary from frame to frame due to MACsec processing. A MACsec processed frame may have sixteen to thirty-two additional bytes over the frame before MACsec processing. The rate at which data in the frame received for transmission are transmitted from the PHY varies depending on the number bytes added for MACsec processing and number of bytes in the frames received for transmission. The transmit buffer 111 may signal the higher-layer device to defer supply frames when its space for storing frames is limited. The signaling, in some embodiments, is provided via the receive path, for example, signaled during gaps between frames transmitted to the higher-layer device.

A shaper 113 schedules frames from the transmit buffer 111 for processing by subsequent blocks in the transmit path 102. The shaper 113 may, for example, supply frames at rates based on network traffic engineering design. In one embodiment, frames are supplied for processing by the subsequent blocks when frames are available from the transmit buffer 111 and the subsequent blocks are ready to accept the frames.

A transmit MACsec classifier 131 receives the frames from the shaper 113 and determines classes of security processing, if any, to be performed in the PHY. For example, some frames may be classified to have a signature added to allow verification at a receiving device, other frames may be classified to be encrypted, and other frames may be classified to receive no MACsec processing. Frames may also be classified as being in a particular security association. The classifications also indicate which portions of the frames are to receive security processing. For example, for frames with VLAN tags for use during WAN transport, the tags may be omitted from processing so that the tags may be used during transport. In another example, for frames encapsulated inside of Multiprotocol Label Switching (MPLS) packets for use during WAN transport, the MPLS encapsulation headers may also be omitted from processing. A frame may contain multiple VLAN tags and/or MPLS labels with some tags and/or labels included in the MACsec processing and others omitted. In some embodiments, the transmit MACsec classifier 131 checks frame check sequence values in the frames and filters frames whose values are in error.

The transmit MACsec classifier 131 may classify frames using values in fields of the frames, such as source address, destination addresses, and Ethernet types. In some embodiments, the transmit MACsec classifier 131 classifies frames according to values of tags in the frames, such as VLAN tags or MPLS labels. Classification may use combinations of features. Frames that receive MACsec processing have bits added to the frames, accordingly the transmit MACsec classifier 131 may signal the transmit buffer 101 or shaper 103 for use in buffering the frames. Additionally, the transmit MACsec classifier 131 may classify some frames to be filtered and not transmitted from the PHY.

A transmit cipher block 133 receive frames and their classification from the transmit MACsec classifier 131. A cipher is applied to each frame classified to receive MACsec processing. The cipher is applied to portions of the frames as indicated by the classification determined in the transmit MACsec classifier 131. An integrity check value (ICV) is added to the frames based on the cipher processing. Some frames may also have portions of the frame encrypted by the cipher processing. The portion encrypted is, for many classifications, a subset of the portion used to produce the ICV. The transmit cipher block 133 adds a security tag to the frames that receive processing. In some embodiments, the tag is added according to IEEE Std. 802.1AE.

A transmit MACsec control block 135 processes frames from the transmit cipher block 133 before the frames are transmitted from the PHY. The transmit MACsec control block 135 may compile statistics regarding the frames, such as the number of frames, the size of the frames, and the size changes for MACsec processing. Additionally, the transmit MACsec control block 135 may calculate frame check sequence (FCS) values for inclusion in the frames.

A transmitter 141 receives the frames from the transmit MACsec control block 135 and converts data in the frames to the output signal. In many embodiments, the output signal is transmitted according to a standard format, for example, a standard for Ethernet. The transmitter 141 includes circuitry for producing the output signal, such as a serializer when the embodiment produces the output signal according to a serial format.

The receive path 104 includes a receiver 151 that receives the input signal from the communication network. In many embodiments, the input signal is received according to the same standard format as used for the output signal from the transmitter 141. The receiver 151 processes the input signal to recover data from the input signal and produce frames. The receiver 151 includes circuitry, such as a deserializer for use when the input signal is received according to a serial format. In some embodiments, the receiver 151 also determines starts of the frames, for example, by determining that start of frame delimiter signals have been received.

A receive MACsec classifier 171 receives frames from the receiver 151 and determines classes of security processing, if any, to be performed in the PHY on the received frames. The classifications will generally correspond to MACsec processing performed when the frames were transmitted. For example, some frames may be classified to have a signature in the frames verified, other frames may be classified to be decrypted, and other frames may be classified to receive no MACsec processing. Frames may also be classified as to membership in a particular security association. The classifications also indicate what portions of the frames are to receive processing. For example, an MPLS encapsulation header or some VLAN tags in the frames may be omitted from processing. In some embodiments, the receive MACsec classifier 171 checks frame check sequence values in the frames and filters frames whose values are in error.

A receive cipher block 173 receives the frames and their classifications from the receive MACsec classifier 171. A cipher is applied to each frame classified to receive MACsec processing. The cipher is applied to portions of the frames as indicated by the classification. The cipher uses the ICV in the frame to verify its integrity. The receive cipher block 173 may drop frames that fail integrity verification. Depending on the classification, portions of the frames may also be decrypted. The portion decrypted is, for many classifications, a subset of the portion whose integrity is verified. The receive cipher block 173 may use security tags in the frames to provide parameters for the processing performed and also to verify frame integrity, for example, a sequence number may be verified.

A receive MACsec control block 175 processes frames from the receive cipher block 173 before the frames are transmitted to the higher layer. The receive MACsec control block 175 may filter some frames, for example, frames may arrive with VLAN tags that are not correct for the receiving device. The receive MACsec control block 175 may also compile statistics regarding the frames, such as the number of frames, the size of the frames, and the number of frames with MACsec processing. Additionally, the receive MACsec control block 175 may recalculate frame check sequence (FCS) values for inclusion in the frames. In some embodiments, invalid FCS values may be included in frames that failed verification in the receive cipher block 173 to signal a receiving device that the frame is invalid.

A receive buffer 191 receives frames from the receive MACsec control block 175 and transmits the frames to the interface block 108. The receive buffer 191 buffers the frames to match rates that may differ between reception and transmission. For example, in some embodiments, the reception and transmission may occur at rates that are nominally equal but that have different deviations from the nominal rate. In some embodiments, the receive buffer 191 may supply signals to the higher-layer device to indicate buffering status in the transmit path 102.

Figure 2:
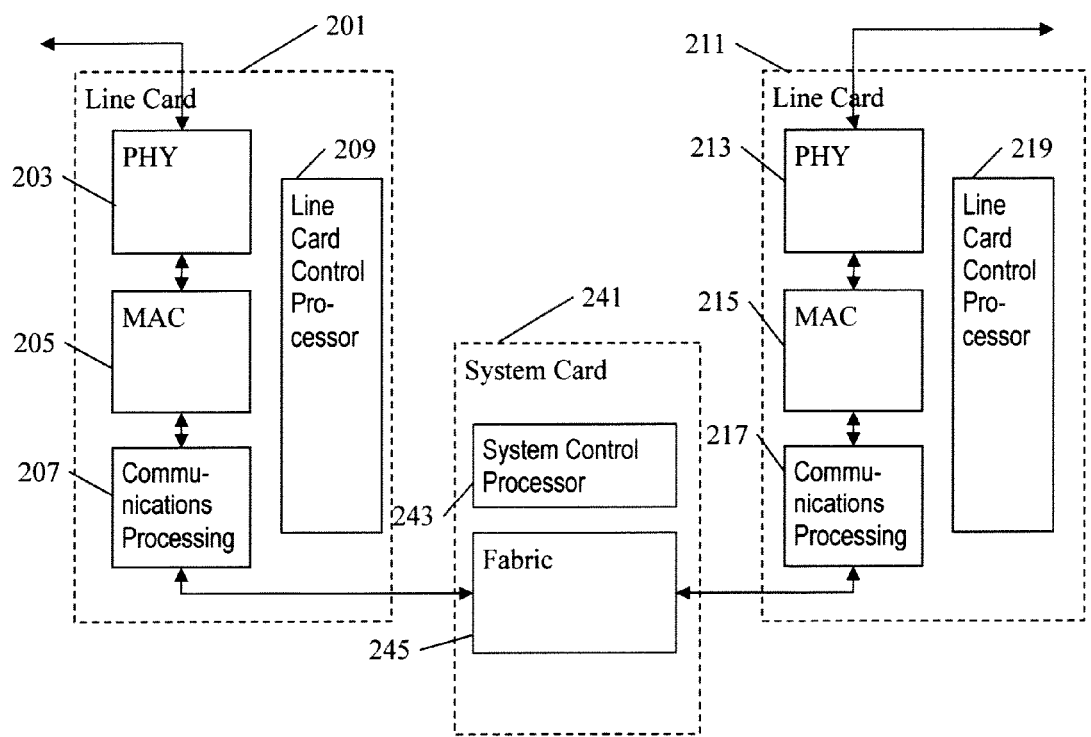
FIG. 2 is a block diagram of a communication network device in accordance with aspects of the invention.

FIG. 2 is a block diagram of a communication network device in accordance with aspects of the invention. The device includes a first line card 201 and a second line 211 for transmitting and receiving frames to and from a communication network. The first line card includes a PHY 203 that provides MACsec processing. The PHY may be a PHY as described with reference to FIG. 1. The PHY is coupled to a MAC 205 which is coupled to a communications processing module 207. The MAC may add VLAN tags to some frames that are transmitted by the line card and remote VLAN tags from some frames received by the line card. The communications processing module may encapsulate some of the Ethernet frames inside MPLS packets on transmission and decapsulate Ethernet frames from MPLS packets on reception. The PHY may perform MACsec processing on selected portions of the frames, for example, excluding some VLAN tags or the MPLS encapsulation header. Operation of the first line card is controlled and monitored by a line card control processor 209. The second line card 211 includes corresponding blocks and in some embodiments is the same as the first line card. FIG. 2 shows two line cards but a system may include many more line cards.

A system card 241 is coupled to the first and second line cards. A switch fabric 245 couples the line cards and switches frames between line cards. A system control processor 243 controls and monitors operation of the system card.

Figure 3:
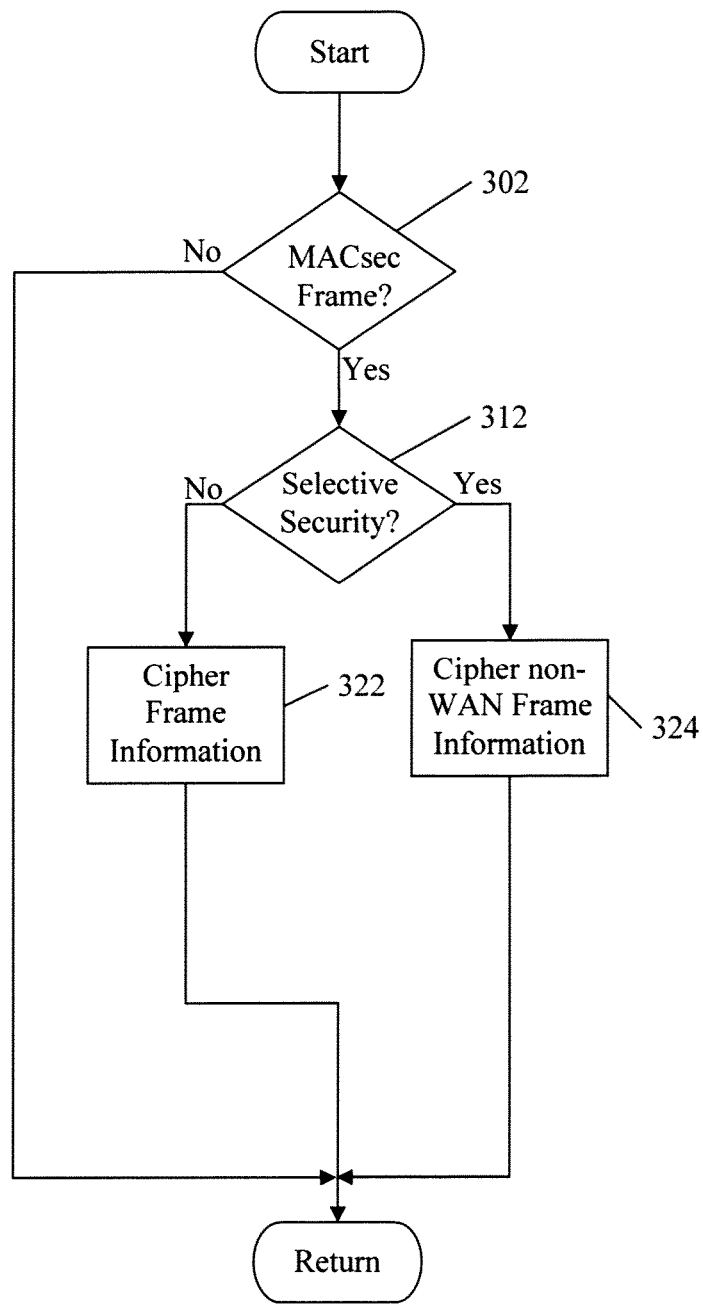
FIG. 3 is a flowchart of a process for security processing in accordance with aspects of the invention.

FIG. 3 is a flowchart of a process for security processing in accordance with aspects of the invention. The process may be implemented by a PHY device, for example, the device of FIG. 1.

In block 302, the process receives a frame. In some embodiments, the frame is received from a communication link for transfer to a higher-layer device. In other embodiments, the frame is received from a higher-layer device for transmission to a communication link.

In block 302, the process determines whether the frame is a frame that will receive MACsec processing. Whether the frame will receive MACsec processing may be determined for frames received from a communication link by the presence of a security tag in the frame. The process may alternatively or additionally determine whether the frame will receive MACsec processing utilizing values of source and destination addresses in the frame or the values of other tags, such as a VLAN tag or an MPLS header. If the frame is a frame that will receive MACsec processing, the process continues to block 312; otherwise, the process returns.

In block 312, the process determines whether the frame is a frame that will receive selective security processing, that is, processing on selected portions of the frame. Whether the frame will receive selective security processing may be determined, in various embodiments, by values in a security tag in the frame, values of source and destination addresses in the frame, values of other tags, such as a VLAN tag or an MPLS header, or a combination of values in the frame. The process also determines which portions of the frame will receive security processing. If the frame is a frame that will receive selective security processing, the process continues to block 324; otherwise, the process continues to block 322.

In block 322, the process performs security processing on the frame. For example, the process may perform MACsec processing according to IEEE Std. 8021AE. The particular processing performed varies with, for example, whether the frame was received from the communication network or is being prepared for transmission to the communication network. The process thereafter returns.

In block 324, the process performs security processing on the portions of the frame determined in block 312. For example, when the frame was received from the communication network, the process may decrypt the frame omitting VLAN tags. For another example, when the frame is being processed for transmission to the communication network, the process may encrypt the frame omitting the MPLS encapsulation header. The process thereafter returns.

Figure 4:
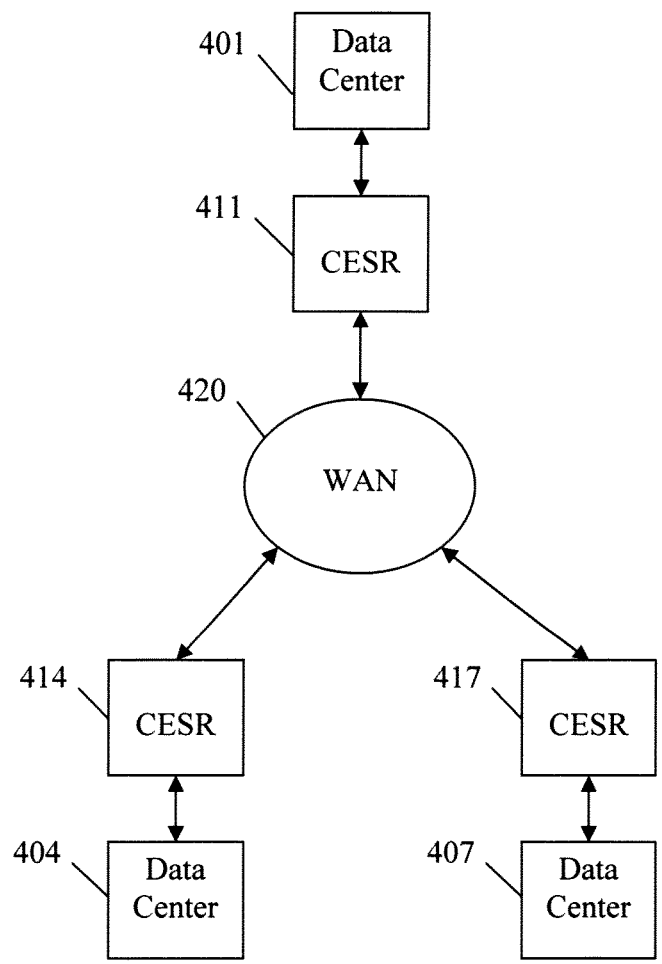
FIG. 4 is a block diagram of a communication network in accordance with aspects of the invention.

FIG. 4 is a block diagram of a communication network in accordance with aspects of the invention. The network provides communication with security processing to avoid, for example, unauthorized use of the network or unauthorized reception of information from the network. The communication network illustrated in FIG. 4 includes a first data center 401, a second data center 404, and a third data center 407. The data centers may include computing devices such as computer servers or, for example in a corporate office, client devices that access computing devices in another data center. The first data center is coupled to a first network device 411, the second data center is connected to a second network device 414, and the third data center is connected to a third network device 417. The network devices may be the communication network device of FIG. 2. In some embodiments, the network devices may be carrier Ethernet switch routers. The network devices provide communication between the data centers through a wide area network 420. In some embodiments, the network devices may communicate through another type of network such as a metropolitan area network. The communication through the wide area network may establish a logical point-to-point mesh between the data centers. The communication through the wide area network may also establish a logical multipoint connection between data centers. The network devices may provide networking services such as a virtual private network or a network firewall.

The wide area network, in one embodiment, uses VLAN tags for transporting information through the network. The network devices add the tags to frames transmitted to the wide area network and remove tags from frames received from the wide area network. The tags may signal information such as ownership of data, connectivity across the wide area network, and priorities. The network devices also protect frames, for example, using MACsec to provide integrity check values and/or to encrypt data in the frames. However, tags used in the wide area network may be omitted from the security processing, thus allowing the devices in the wide area network ability to read and modify the tags. In some embodiments, however, the tags used in the wide area network devices may be subject to some security processing, for example protection by way of an integrity check value calculated using information of the tags, but without encryption of the tags. This allows devices in the wide area network to perform actions based on information in the tags, but without allowing the network devices to modify the tags which likely corrupts the integrity check value.

The wide area network, in one embodiment, uses MPLS headers to transport information through the network. The network devices encapsulate frames inside of MPLS packets for transmission to the wide area network and decapsulate the frames from MPLS packets upon reception from the wide area network. The MPLS headers may signal information such as a routing path. In some embodiments, the encapsulated packets are transported using an Ethernet standard and the MPLS header includes source and destination addresses, an Ethernet type field, and an MPLS label or labels. The network devices also protect frames, for example, using MACsec. However, when MPLS headers are used in the wide area network they are omitted from the security processing, thus providing the devices in the wide area network full access to the headers as required by certain MPLS standards. In some embodiments, however, the MPLS headers are used in determining an integrity check value, but without encryption of the MPLS headers.

An embodiment of various frame formats that may be used in the above devices and processes are summarized in Table I. A first table column, "Unprotected Format," gives formats used before MACsec processing is applied. For example, frames may have these formats between the PHY of FIG. 1 and a higher-layer device. "Untagged Ethernet" refers to frames without VLAN tags formatted according to IEEE Std. 802.3. "Single-Tagged Ethernet" and "Dual-Tagged Ethernet" refers to Ethernets frames with, respectively, one or two VLAN tags according to IEEE Stds. 802.1Q and 802.1ad. "EoMPLS" refers to Ethernet over MPLS, that is, Ethernet frames transported inside MPLS packets. "EoMPLS with One Label" and "EoMPLS with Two Labels" refers to EoMPLS where the MPLS packets have, respectively, one or two MPLS labels.

A second table column, "Protected Format," gives formats used after MACsec processing is applied. For example, frames may have these formats between the PHY of FIG. 1 and a dual-tagged Ethernet frame. "MPLS Label" refers to a label used in a single-label MPLS header. "MPLS Label1" and "MPLS Label2" refer to labels used in a two-label MPLS header. "Control Word or ACH/G-ACH" refers to an optional field that may be present in MPLS headers.

A fourth table column, "Fields for Receive Classification," shows fields in the Protected Format frames that may be used to determine how security processing will be performed. For example, the fields may be used by the receive MACsec classifier in the PHY of FIG. 1. "SecTAG" refers to the security tag as specified by IEEE Std. 802.1AE.

Interpretation of rows of the table may be understood by considering an example. The Single-Tagged Ethernet row may be used with frames that arrive at a PHY with one VLAN tag. The frames are classified using DA, SA, VLAN tag, and/or Etype fields. Before transmission to a communication network, the frame may receive security processing as standard MACsec or as MACsec with single tag bypass. Frames that received standard MACsec processing are classified upon receipt from the communication network using DA, SA, and/or SecTAG fields. Frames that received MACsec with single tag bypass processing are classified upon receipt from the communication network using DA, SA, VLAN Tag, and/or SecTAG fields.

TABLE I

| Unprotected Format | Protected Format | Fields for Transmit Classification | Fields for Receive Classification |
|---|---|---|---|
| Untagged Ethernet | Standard MACsec | DA, SA, Etype | DA, SA, SecTAG |
| Single-Tagged Ethernet | Standard MACsec MACsec plus Single Tag Bypass | DA, SA, VLAN tag, Etype | DA, SA, SecTAG. DA, SA, VLAN Tag, SecTAG |
| Dual-Tagged Ethernet | Standard MACsec MACsec plus Single Tag Bypass MACsec plus Dual Tag Bypass | DA, SA, VLAN tag1, VLAN tag2, Etype | DA, SA, SecTAG. DA, SA, VLAN tag1, SecTAG DA, SA, VLAN Tag1, VLAN Tag2, SecTAG |
| EoMPLS with One Label | Standard MACsec MACsec plus EoMPLS Header Bypass | DA, SA, Etype, MPLS Label, optional Control Word or ACH/G-ACH | DA, SA, SecTAG. DA, SA, Etype, MPLS label, optional Control Word or ACH/G-ACH, SecTAG |
| EoMPLS with Two Labels | Standard MACsec MACsec plus EoMPLS Header Bypass | DA, SA, Etype, MPLS Label1, MPLS Label2, optional Control Word or ACH/G-ACH | DA, SA, Etype, SecTAG DA, SA, Etype, MPLS Label1, MPLS Label2, optional Control Word or ACH/G-ACH, SecTAG | from a communication link. "Standard MACsec" refers to the format described in IEEE Std. 802.1AE. "MACsec plus Single Tag Bypass" refers to MACsec processing where one VLAN tag is excluded from security processing. "MACsec plus Dual Tag Bypass" refers to MACsec processing where two VLAN tags are excluded from security processing. "MACsec plus EoMPLS Header Bypass" refers to MACsec frames where the MPLS encapsulation header is excluded from security processing.

A third table column, "Fields for Transmit Classification," shows fields in the Unprotected Format frames that may be used to determine how security processing will be performed. For example, the fields may be used by the transmit MACsec classifier in the PHY of FIG. 1. "DA" and "SA" refer to the source address and destination address respectively. "Etype" refers to the Ethernet type fields. "VLAN tag" refers to the VLAN tag in a single-tagged Ethernet frame. "VLAN tag1" and "VLAN tag2" refer to the first and second VLAN tags in FIGS. 5-9 are diagrams of frame formats in accordance with aspects of the invention. One or more of the frame formats may be used in an embodiment.

Figure 5:
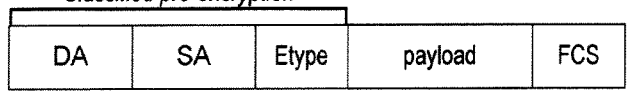
FIGS. 5-9 are diagrams of frame formats in accordance with aspects of the invention.
Figure 5:
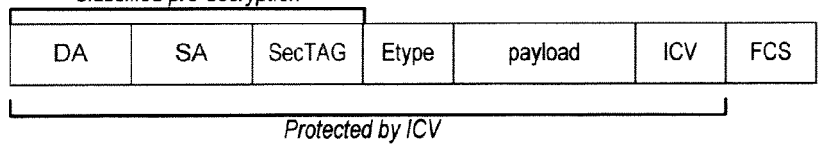

FIG. 5 shows formats for an untagged Ethernet frame. Format 501 is before MACsec processing and format 511 is after MACsec processing. Before security processing the format includes a destination address (DA), a source address (SA), and an Ethernet type (Etype) that may be used to classify frames for security processing. The frames also include a payload of application data and a frame check sum (FCS). The payload may include various other fields that are not separately analyzed or processed by the security processing. The format 511 for use after processing adds a security tag (SecTAG) and an integrity check value (ICV). The DA, SA, SecTAG, Etype, payload, and ICV are protected by the security processing. On receipt of a frame according to format 511, the DA. SA, and SecTAG may be used to classify the frame for security processing.

Figure 6:
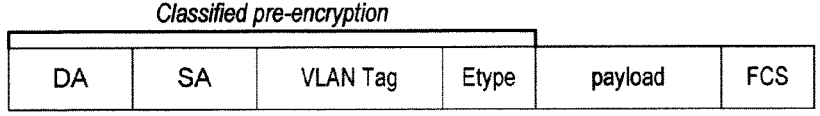
Figure 6:
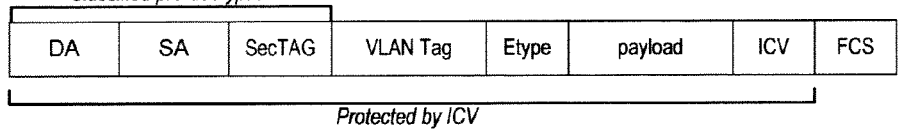
Figure 6:
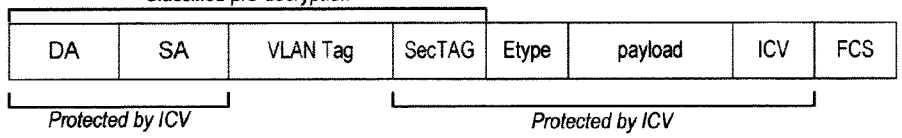

FIG. 6 shows formats for a tagged Ethernet frame. Format 601 is before MACsec processing. Format 611 is after MACsec processing of the full frame, and format 621 is after MACsec processing of portions of the frame. Compared to the formats of FIG. 5, the formats of FIG. 6 include a virtual LAN tag (VLAN tag). The VLAN tag may also be used to classify frames having format 601 for security processing. In format 611, the VLAN tag is included in the information protected by the security processing. In format 621, the VLAN tag is excluded from the information protected by the security processing. Accordingly, on receipt of frames with format 611 the VLAN tag is not used to classify for security processing but with format 621 the VLAN tag may be used to classify for security processing.

Figure 7:
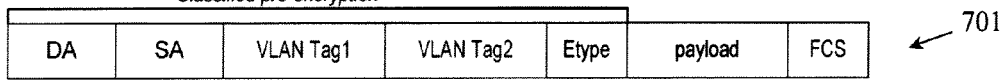
Figure 7:
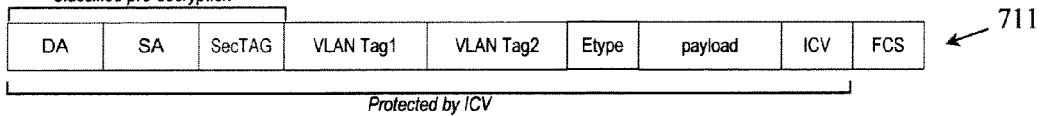
Figure 7:
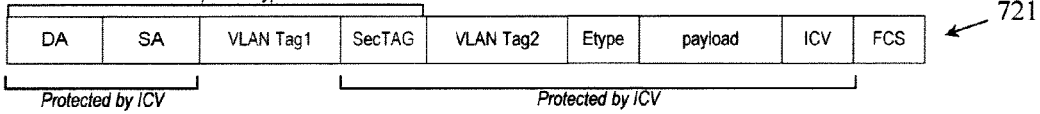
Figure 7:
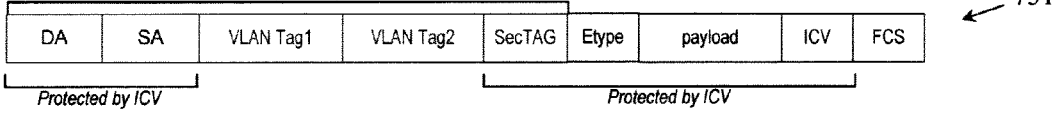

FIG. 7 shows formats for a double tagged Ethernet frame. Format 701 is before MACsec processing Format 711 is after MACsec processing of the full frame. Format 721 is after MACsec processing of portions of the frame excluding one tag. Format 731 is after MACsec processing of portions of the frame excluding two tags. Compared to the formats of FIG. 5, the formats of FIG. 7 include two VLAN tags. The VLAN tags may be used in classifying frames having format 701 for security processing. In format 711, the VLAN tags are included in the information protected by the security processing. In format 721, one VLAN tag is included and one VLAN tag is excluded from the information protected by the security processing. In format 731, both VLAN tags are excluded from the information protected by the security processing. Accordingly, on receipt of frames with format 711 the VLAN tags are not used to classify for security processing, on receipt of frames with format 721 the VLAN tag excluded from security processing may be used to classify for security processing, and on receipt of frames with format 731 the VLAN tags may be used to classify frames for security processing.

Figure 8:
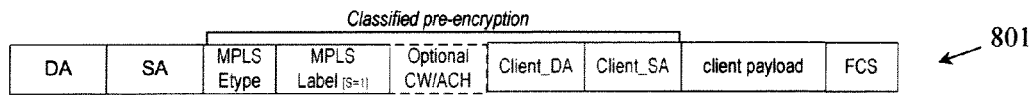
Figure 8:
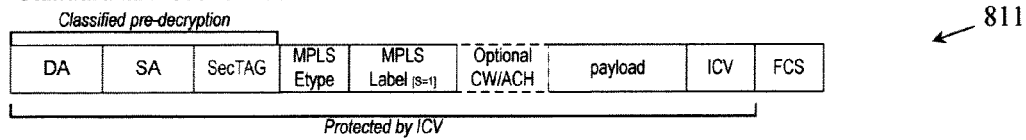
Figure 8:
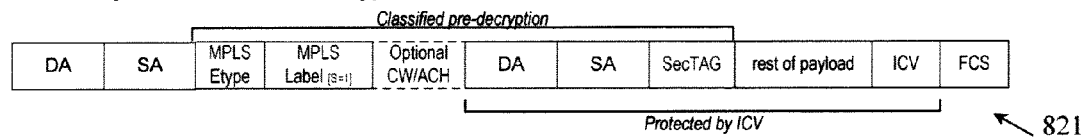

FIG. 8 shows formats for an Ethernet frame within an MPLS packet. Format 801 is before MACsec processing. Format 811 is after MACsec processing of the full MPLS frame, and format 821 is after MACsec processing of only the encapsulated frame. Compared to the formats of FIG. 5, the formats of FIG. 8 include an MPLS header with an MPLS Etype, an MPLS Label, and an optional CW/ACH field included in some frames. The MPLS header may be used in classifying frames having format 801 for security processing. In format 811, the MPLS header is included in the information protected by the security processing. In format 821, the MPLS header is excluded from the information protected by the security processing. Accordingly, on receipt of frames with format 811 the MPLS header is not used to classify for security processing but with format 821 the MPLS header may be used to classify for security processing.

Figure 9:
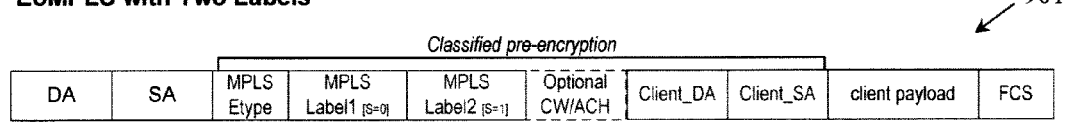
Figure 9:
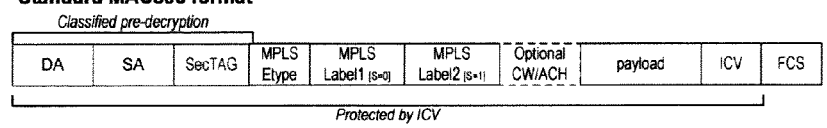
Figure 9:
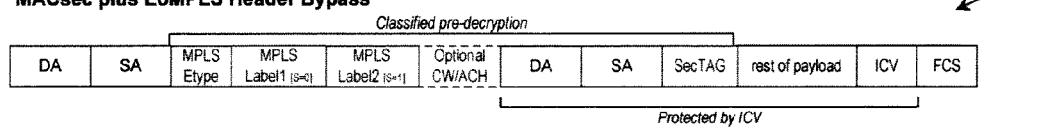

FIG. 9 shows formats for an Ethernet frame with an MPLS header with two labels. Format 901 is before MACsec processing. Format 911 is after MACsec processing of the full MPLS frame, and format 921 is after MACsec processing of portions of the frame. Compared to the formats of FIG. 8, the formats of FIG. 9 have an MPLS header with two labels.

Although the invention has been discussed with respect to various embodiments, it should be recognized that the invention comprises the novel and non-obvious claims supported by this disclosure.

What is claimed is:

1. A transmission device for a communications network, the transmission device comprising:
    circuitry to buffer and schedule further processing of a frame for transmission;
    circuitry configured to determine a class of security processing to perform on the frame for transmission based on a source address, a destination address, a virtual local area network (VLAN) tag, and an Ethernet type (Etype), the class of security processing being determined from among a set of classes including standard media access control security (MACsec), single tag bypass MACsec, dual tag bypass MACsec, and Ethernet over multiprotocol label switching (EoMPLS) header bypass MACsec, and to signal the circuitry to buffer and schedule if security processing is to be performed on the frame based on the determined class of security processing;
    circuitry configured to apply security processing to the portion of the frame to generate a secured frame, the applied security processing excluding application of security processing of one VLAN tag of the frame for the single tag bypass MACsec class of security processing and the applied security processing excluding application of security processing of at least two VLAN tags of the frame for the dual tag bypass MACsec class of security processing, the security processing including adding an integrity check value (ICV) to the frame, the ICV covering portions of the frame excluding the one VLAN tag for the single tag bypass MACsec class of security processing and excluding the at least two VLAN tags for the dual tag bypass MACsec class of security processing; and
    circuitry configured to process the secured frame to calculate a frame check sequence (FCS) value for the secured frame and to generate an output signal for transmission to a communication network.

2. The transmission device of claim 1, wherein applying the security processing includes applying a cipher to the frame, excluding the one VLAN tag for the single tag bypass MACsec class of security processing and excluding the at least two VLAN tags for the dual tag bypass MACsec class of security processing.

3. The transmission device of claim 1, wherein the security processing includes encrypting portions of the frame.

4. The transmission device of claim 1, wherein the class of security processing is determined based on a source address associated with the frame.

5. The transmission device of claim 1, wherein the at least two VLAN tags consist of two VLAN tags.

6. The transmission device of claim 1, wherein the ICV provides protection for at least a destination address of the frame, a source address of the frame, a security tag for the frame, and a payload of the frame.

7. The transmission device of claim 6, wherein the one VLAN tag for the single tag bypass MACsec class of security processing has a position in the frame at a location between the source address and the security tag.

8. A method for performing security processing on communications frames including tags for use in a wide area network, the method comprising:
    determining whether a frame is to receive selective security processing based on a source address, a destination address, a virtual local area networking (VLAN) tag, and an Ethernet type (Etype) associated with the frame;
    if the frame is to receive selective security processing, determining a class of security processing, the class of security processing being determined from among a set of classes including standard media access control security (MACsec), MACsec plus single tag bypass, MACsec plus dual tag bypass, and MACsec plus Ethernet over multiprotocol label switching (EoMPLS) header bypass;
    signaling a frame scheduler whether the frame is to receive selective security processing;

performing security processing on portions of the frame other than one VLAN tag of the frame for the MACsec plus single tag bypass class of security processing and performing security processing on portions of the frame other than at least two VLAN tags of the frame for the MACsec plus dual tag bypass class of security processing, the security processing including adding an integrity check value (ICV) to the frame, the ICV covering portions of the frame excluding the one VLAN tag for the single tag bypass MACsec class of security processing and excluding the at least two VLAN tags for the dual tag bypass MACsec class of security processing;

calculating a frame check sequence (FCS) for the security processed frame; and transmitting the security processed frame, including the FCS.

9. The method of claim 8, wherein the security processing comprises Media Access Control Security (MACSec) processing.

10. The method of claim 8, wherein the at least two VLAN tags consist of two VLAN tags.

11. The method of claim 8, wherein the security processing comprises applying a cipher to portions of the frame.

12. The method of claim 8, wherein the one VLAN tag precedes a security tag in the frame.

* * * * *